United States Patent [19]

Bremner

[11] Patent Number: 4,552,581

[45] Date of Patent: Nov. 12, 1985

[54] METHOD OF INHIBITING NITRIFICATION OF AMMONIUM NITROGEN

[75] Inventor: John M. Bremner, Ames, Iowa

[73] Assignee: Iowa State University Research Foundation, Inc., Ames, Iowa

[21] Appl. No.: 606,893

[22] Filed: May 3, 1984

[51] Int. Cl.[4] .................................................. C05G 3/08
[52] U.S. Cl. .......................................... 71/61; 71/902; 71/903; 71/27
[58] Field of Search .................... 71/902, 27, 61, 64.1, 71/903

[56] References Cited

FOREIGN PATENT DOCUMENTS 55-58500 5/1980 Japan .
55-58501 5/1980 Japan .

OTHER PUBLICATIONS

CA 96(15) 117583r, Kanesho, 1981, Soil Disinfectant Composition.
CA 96(15) 117584s, Kanesho, 1981, Soil Disinfectant Composition.

*Primary Examiner*—Ferris H. Lander

[57] ABSTRACT

Phenylacetylene is added to agricultural field soil containing ammonium nitrogen fertilizer, thereby promoting nitrogen retention by inhibiting soil bacteria nitrification.

6 Claims, No Drawings

METHOD OF INHIBITING NITRIFICATION OF AMMONIUM NITROGEN

BACKGROUND AND PRIOR ART

Most of the widely used nitrogen source fertilizers provide the soil with ammonium nitrogen. These fertilizers include liquid ammonia, urea, and ammonium salts such as ammonium sulfate. Upon addition to the soil they form ammonium ions which act as a suitable nitrogen source for cultivated crops. Urea nitrogen is rapidly hydrolyzed in soil to ammonium nitrogen. The ammonium form of nitrogen is positively charged and is attracted to the negatively charged soil particles. Thus this form of nitrogen is sorbed by the soil while remaining available for plant utilization.

However, soils contain nitrifying bacteria which can act on the ammonium converting the nitrogen to the oxidized forms of nitrite and nitrate. Oxidized forms of nitrogen are negatively charged so they are not attracted to the soil particles. Being soluble in water they can be lost by leaching into the ground water. Loss can also occur by the action of denitrifying bacteria which convert nitrate to gaseous forms of nitrogen which enter the atmosphere.

For the purpose of conserving ammonium nitrogen in soil, the practice has therefore developed of adding compounds to soil which act as nitrification inhibitors, sometimes referred to as nitrificides. They act to inhibit nitrification of ammonium nitrogen by nitrifying bacteria.

In commercial practice in the United States two nitrificides are in primary use. One of these is the compound etridiazole (5-ethoxy-3-trichloromethyl-1,2,4-thiadiazole), which is sold under the trademark "Dwell" by Olin Corporation, Little Rock, Ark. The other compound is nitrapyrin which is sold under the trademark "N-Serve" by The Dow Chemical Company, Midland, Mich. The full chemical name of nitrapyrin is 2-chloro-6-(trichloromethyl) pyridine. These commercial inhibitors are relatively complex, expensive chemicals.

Acetylenic alcohols comprising substituted propynols have been proposed as soil nitrification inhibitors, but are not known to have been used commercially. See U.S. Pat. No. 3,033,668. The 1-substituted-2-propyn-1-ols as described in the cited patent include alkyl, alkenyl, phenyl, aralkyl and other substitutions.

It has been shown that acetylene ($C_2H_2$) in a closed system will inhibit nitrification of ammonium nitrogen in soil. Walter et al (1979) *Soil Sci. Soc. Am. J.*, 43: 195–196; and Bremner et al (1979) *Nature*, 280 (5721): 380–381. However, acetylene is not a practical nitrificide for field use. It is explosive gas, which would be difficult and dangerous to apply, and which would not be retained in the soil.

SUMMARY OF INVENTION

This invention is based on the discovery that phenylacetylene (phenylethyne) is a highly effective and practical nitrification inhibitor. Phenylacetylene is a liquid at ordinary temperatures. It can be handled safely and applied to soil by convenient procedures. Further, in comparative tests it has been shown that phenylacetylene is as effective as the present commercial inhibitors nitrapyrin ("N-Serve") and etridiazole ("Dwell"). Phenylacetylene can be applied to soil in the form of an aqueous emulsion or in an organic solvent compatible with soil.

DETAILED DESCRIPTION

Phenylacetylene is a well known derivative of acetylene which is commercially available in the United States. One commercial source is Farchan Labs, Willoughby, Ohio 44094. It is a liquid at ordinary temperatures, its atmospheric boiling point being 142° C. It is miscible with organic solvents, such as the aromatic hydrocarbon solvents like xylene and toluene. It can also be formed into a stable aqueous emulsion by the use of a suitable emulsifying agents such as xylene.

Phenylacetylene can be used for inhibiting nitrification of ammonium nitrogen in any plant growth medium containing a fertilizer providing ammonium nitrogen. It may be used under artificial growing conditions such as greenhouse cultivation. Its primary use will be under outdoor field conditions wherein it is applied to field soil treated with fertilizers like liquid ammonia, urea, ammonium sulfate, etc., which provide ammonium nitrogen.

The method of use and application of phenylacetylene can follow practices developed for the present commercial nitrificides. The only requirement is that the phenylacetylene is incorporated in the growth medium so that there is present therein an effective nitrification inhibiting amount. The amount required for effective inhibition will, of course, vary depending on the field conditions such as type of soil, weather conditions, etc. Usually it will be desirable to apply at least 0.10 pounds of phenylacetylene per acre. If required, it is believed that amounts up to 2 pounds per acre can be used. A preferred range for effective action may range from about 0.25 to 0.50 pounds per acre.

The phenylacetylene is preferably applied so that it will penetrate the soil surface, becoming mixed with the upper 2 to 10 inches of soil. It is believed advantageous to utilize concentrations of from 0.2 to 1.0 ppm of the phenylacetylene based on the weight of soil treated.

The method of this invention is further illustrated by the following examples.

EXAMPLE I

Samples of air-dried soil (10 g) were incubated in sealed flasks at 30° C. for 7 days after treatment with 4 ml water containing 2 mg N as $(NH_4)_2SO_4$ and 0, 0.5, or 1.0 $\mu M$ $g^{-1}$ soil of phenylacetylene. Two types of soil were used, Storden classified as an Udorthents soil and Webster classified as a Haplaquol soil. The results are summarized below in Table A.

TABLE A

| Inhibitor | Amount Added ($\mu M$ $g^{-1}$ soil) | % Inhibition (7 days) Webster | % Inhibition (7 days) Storden |
|---|---|---|---|
| Phenylacetylene ($C_6H_5C{:}CH$) | 0.5 | 99 | 100 |
| | 1.0 | 100 | 100 |

EXAMPLE II

Samples of air-dried soil (10 g) were incubated in sealed flasks at 30° C. for 7 days after treatment with 4 ml water containing 2 mg N as $(NH_4)_2SO_4$ and 0, 0.01 or 0.05 $\mu M$ $g^{-1}$ soil of compound specified. In addition to testing lower levels of phenyacetylene than in the experiment of Example I, an additional soil was tested, Harps, a Calciaquoll type soil. Phenylacetylene was compared with two commercial inhibitors ("N-Serve"

and "Dwell") and 1-phenyl-2-propyn-1-ol (see U.S. Pat. No. 3,033,668). The results are summarized in Table B.

TABLE B

| Inhibitor | Amount added ($\mu$M g$^{-1}$ soil) | % Inhibition (7 days) | | |
|---|---|---|---|---|
| | | Harps | Webster | Storden |
| Phenylacetylene | 0.01 | 67 | 83 | 96 |
| | 0.05 | 95 | 98 | 100 |
| Nitrapyrin | 0.01 | 50 | 68 | 100 |
| (N-Serve) | 0.05 | 79 | 91 | 100 |
| Etridiazole (Dwell) | 0.01 | 61 | 85 | 100 |
| | 0.05 | 88 | 96 | 100 |
| 1-Phenyl-2-propyn-1-ol | 0.01 | 0 | 0 | 4 |
| | 0.05 | 4 | 8 | 46 |

EXAMPLE III

Phenylacetylene may be applied together with an aqueous solution of a nitrogen fertilizer such as ammonium sulfate, aqua ammonium, urea, or ammonium nitrate, preferably at rates ranging from 0.25 to 0.50 pounds per acre. It should be applied with the fertilizer solution in a subsurface zone or band at a minimum depth of 2 to 4 inches below the soil surface or surface broadcast with the fertilizer solution and incorporated during or immediately after application to a depth of 2 to 4 inches below the soil surface. Phenylacetylene can be dispersed as an emulsion in fertilizer solutions by the use of xylene. Preferably the solution-emulsion formula is mixed prior to and during application.

EXAMPLE IV

To compare the effects of phenylacetylene, 1-phenyl-2-propyn-1-ol, nitrapyrin and etridiazole on seed germination, alfalfa and wheat seeds were placed between two discs of germination paper (85 mm) or on soil (40 g) in a petri dish, and the dish was covered with a lid and placed in an incubator maintained at 20° C. for 9 days after addition of 10 ml water containing 0, 0.005, or 0.025 g of the inhibitor specified. The results are summarized in Table C.

TABLE C

| Inhibitor | Amount (g/dish) | % Germination[a] | | | |
|---|---|---|---|---|---|
| | | Alfalfa | | Wheat | |
| | | GP | WS | GP | WS |
| None | | 93 | 92 | 92 | 94 |
| Phenylacetylene | 0.005 | 93 | 91 | 92 | 92 |
| | 0.025 | 92 | 92 | 93 | 94 |
| 1-Phenyl-2-propyn-1-ol | 0.005 | 84 | 92 | 0 | 67 |
| | 0.025 | 0 | 7 | 0 | 0 |
| Nitrapyrin (N-Serve) | 0.005 | 93 | 93 | 93 | 92 |
| | 0.025 | 81 | 92 | 12 | 66 |
| Etridiazole (Dwell) | 0.005 | 91 | 93 | 93 | 93 |
| | 0.025 | 83 | 92 | 17 | 84 |

[a]GP, Germination paper; WS, Webster soil.

I claim:

1. The method of inhibiting nitrification of ammonium nitrogen in a plant growth medium containing a fertilizer providing ammonium nitrogen, comprising having present in said growth medium an effective nitrification inhibiting amount of phenylacetylene.

2. The method of claim 1 in which said growth medium is field soil and said phenylacetylene is applied to the soil in an effective amount within the range from 0.10 to 2 pounds per acre.

3. The method of promoting the retention of ammonium nitrogen in agricultural field soil to which an ammonium nitrogen-providing fertilizer has been added, comprising applying to said soil phenylacetylene in an effective amount of at least 0.10 pounds per acre to inhibit nitrification of the ammonium nitrogen by soil bacteria.

4. The method of claim 3 in which said phenylacetylene is applied in an amount within the range from 0.1 to 1.0 pounds per acre.

5. The method of claim 3 in which said phenylacetylene is applied to said soil as an aqueous emulsion.

6. The method of claim 4 in which said phenylacetylene is applied to said soil as an aqueous emulsion.

* * * * *